United States Patent
Contreras et al.

(10) Patent No.: US 9,280,993 B2
(45) Date of Patent: Mar. 8, 2016

(54) IMPLEMENTING ASYMMETRIC DEGAUSS CONTROL FOR WRITE HEAD FOR HARD DISK DRIVES

(71) Applicant: HGST Netherlands B.V., Amsterdam (NL)

(72) Inventors: John Contreras, Palo Alto, CA (US); Zhen Jin, Fremont, CA (US); Yuanpeng Li, San Jose, CA (US); Xiaoyu Sui, Fremont, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/104,143

(22) Filed: Dec. 12, 2013

(65) Prior Publication Data

US 2015/0170687 A1    Jun. 18, 2015

(51) Int. Cl.
*G11B 5/465*    (2006.01)

(52) U.S. Cl.
CPC ...................................... *G11B 5/465* (2013.01)

(58) Field of Classification Search
CPC ..... G11B 5/00; G11B 5/465; G11B 20/10037
USPC ............................ 360/55, 39, 65, 66, 110, 46
See application file for complete search history.

(56) References Cited

U.S. PATENT DOCUMENTS

| | | | |
|---|---|---|---|
| 4,607,310 A | 8/1986 | Channel et al. | |
| 5,287,242 A * | 2/1994 | Kamimura | H01F 13/006 315/8 |
| 7,088,537 B2 | 8/2006 | Cronch et al. | |
| 7,106,536 B2 | 9/2006 | Fang et al. | |
| 7,372,653 B2 | 5/2008 | Suzuki et al. | |
| 7,411,753 B2 | 8/2008 | Sakai | |
| 7,813,068 B2 | 10/2010 | Takeuchi | |
| 2005/0190476 A1 * | 9/2005 | Wilson | G11B 5/465 360/46 |
| 2005/0243457 A1 * | 11/2005 | Akamatsu | G11B 5/465 360/55 |
| 2006/0044659 A1 * | 3/2006 | Sakai | G11B 5/455 360/31 |
| 2006/0158764 A1 * | 7/2006 | Suzuki | G11B 5/1278 360/68 |
| 2006/0176597 A1 | 8/2006 | Ngo et al. | |
| 2007/0153410 A1 * | 7/2007 | Hashizume | G11B 5/465 360/66 |
| 2009/0284860 A1 * | 11/2009 | Takeuchi | G11B 5/465 360/69 |
| 2012/0105992 A1 * | 5/2012 | Dina | G11B 5/465 360/27 |
| 2013/0021691 A1 | 1/2013 | Goldberg et al. | |
| 2013/0301156 A1 * | 11/2013 | Dakroub | G11B 5/09 360/46 |
| 2014/0029138 A1 * | 1/2014 | Mazur | G11B 5/465 360/111 |
| 2014/0240864 A1 * | 8/2014 | Livshitz | G11B 20/10027 360/66 |

FOREIGN PATENT DOCUMENTS

WO    WO2007079364 A2    7/2007

OTHER PUBLICATIONS http://ieeexplore.ieee.org/xpl/login.jsp?tp=&arnumber=6028010&url=http%3A%2F%2Fieeexplore.ieee.org%2Fiel5%2F20%2F6027540%2F06028010.pdf%3Farnumber%3D6028010.

* cited by examiner

*Primary Examiner* — Thomas Alunkal
(74) *Attorney, Agent, or Firm* — Joan Pennington

(57) ABSTRACT

A method, apparatus, and system for implementing enhanced asymmetric degauss control for a write head for hard disk drives. A degauss period is provided at the end of a write. The write head is driven asymmetrically with respect to the positive and negative driving currents during the degauss period. The average value of the write current during the degauss period is non-zero.

20 Claims, 7 Drawing Sheets

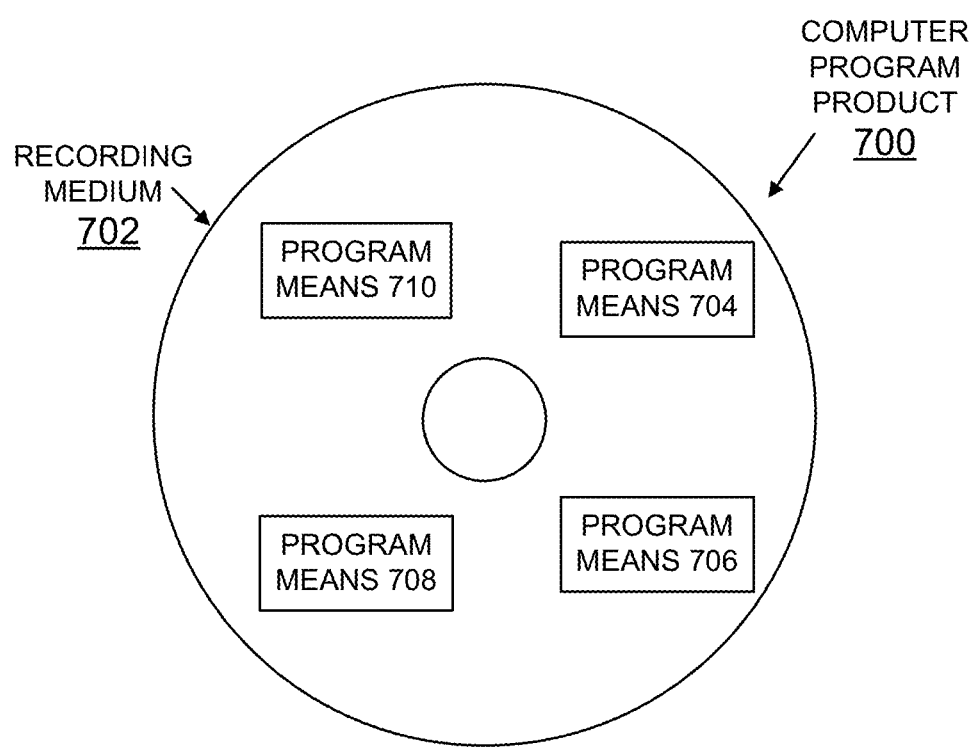

IMPLEMENTING ASYMMETRIC DEGAUSS CONTROL FOR WRITE HEAD FOR HARD DISK DRIVES

FIELD OF THE INVENTION

The present invention relates generally to the data storage field, and more particularly, relates to a method, apparatus, and system for implementing asymmetric degauss control for a write head for hard disk drives (HDDs).

DESCRIPTION OF THE RELATED ART

Many data processing applications require long-term data storage and typically a high-degree of data integrity. Typically these needs are met by non-volatile data storage devices.

Non-volatile storage or persistent media can be provided by a variety of devices, most commonly, by direct access storage devices (DASDs), which also are referred to as hard disk drives (HDDs).

In hard disk drives (HDDs) or a disk-drive system, a read head and a write head reside in a slider which flies over a recording media or disk surface for reading and writing data. Magnetoresistive (MR) sensors typically are used to sense magnetic patterns of data recorded on a writable disk surface. The write head converts an electrical signal or current, which corresponds to the information to be written, into a magnetic field, and writes the information onto the magnetic disk. The write head typically includes a magnetic pole piece and windings around the magnetic pole piece. The direction of a current flowing to the write head is changed to change the direction of the magnetic field to be generated. The direction of magnetic disk magnetization varies with the direction of the magnetic field with data being recorded on the magnetic disk according to the direction of magnetization. A write current, which is necessary for a write, is determined in accordance with required magnetic field strength and the number of windings around the magnetic pole piece.

When the current flowing to the write head is suddenly decreased at the end of a write, the write head is magnetized. As a result of the write head being magnetized, written data may be unintentionally erased, and has been referred to as pole erasure. Data corruption from pole erasure is one of the most severe threats to drive reliability. Various arrangements have been proposed to avoid pole erasure from the write head from being magnetized.

Degaussing advantageously is performed when a write period ends. For example, U.S. Pat. No. 7,372,653 B2 by Suzuki et al., entitled Degauss Waveform Generator for Perpendicular Recording Write Head, issued May 13, 2008, and assigned to the present assignee, discloses a hard disk drive that degausses a write head and a recording method for use with such a hard disk drive, which provide improvements over prior art arrangements. FIG. 4 provides a timing diagram illustrating signal waveforms for degaussing.

A need exists for effective mechanism for implementing enhanced degauss control for a write head for hard disk drives. It is desirable to provide such mechanism to implement asymmetric degauss control and that allows for efficient and effective tuning of a ratio between positive and negative peaks of the degauss waveform.

SUMMARY OF THE INVENTION

Aspects of the present embodiments are to provide a method, apparatus, and system for implementing method, apparatus, and system for implementing enhanced degauss control for a write head for hard disk drives. Other important aspects of the present method, apparatus, and system for implementing asymmetric degauss control for hard disk drives are to provide such method, apparatus, and system substantially without negative effect and to overcome some of the disadvantages of prior art arrangements.

In brief, a method, apparatus, and system for implementing enhanced asymmetric degauss control for a write head for hard disk drives. A degauss period is provided at the end of a write. The write head is driven asymmetrically with respect to the positive and negative driving currents during the degauss period. The average value of the write current during the degauss period is non-zero.

BRIEF DESCRIPTION OF THE DRAWINGS

The present invention together with the above and other objects and advantages may best be understood from the following detailed description of the preferred embodiments of the invention illustrated in the drawings, wherein:

FIG. 7 is a block diagram illustrating a computer program product in accordance with preferred embodiments.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the preferred embodiments, a method, apparatus, and system for implementing asymmetric degauss control for hard disk drives (HDDs) are provided.

Figure 1:
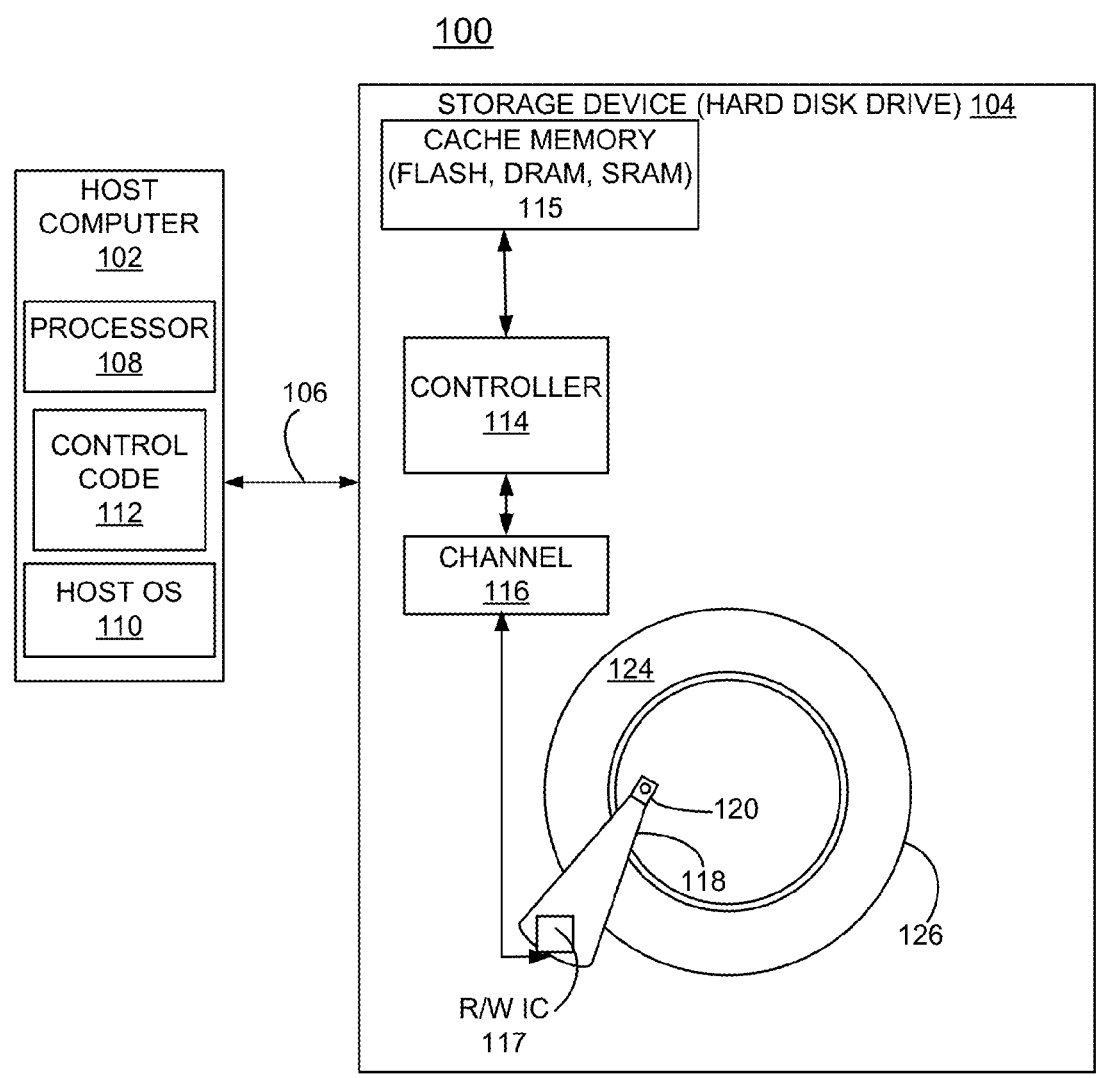
FIG. 1 is a block diagram representation illustrating a system for implementing asymmetric degauss control for hard disk drives in accordance with preferred embodiments.

Having reference now to the drawings, in FIG. 1, there is shown an example system generally designated by the reference character 100 for implementing asymmetric degauss control for hard disk drives (HDDs) in accordance with preferred embodiments. System 100 includes a host computer 102, a storage device 104, such as a hard disk drive (HDD) 104, and an interface 106 between the host computer 102 and the storage device 104.

As shown in FIG. 1, host computer 102 includes a processor 108, a host operating system (OS) 110, and control code 112. The storage device or hard disk drive 104 includes a controller 114 coupled to a cache memory 115, for example, implemented with one or a combination of a flash memory, a dynamic random access memory (DRAM) and a static random access memory (SRAM), and coupled to a data channel 116. The storage device or hard disk drive 104 includes a Read/Write (R/W) integrated circuit (IC) 117 implementing the asymmetric degauss control circuitry in accordance with preferred embodiments. The storage device or hard disk drive 104 includes an arm 118 carrying a slider 120 that contains read and write heads and flies over a writable disk surface 124 of a disk 126.

System 100 including the host computer 102 and the hard disk drive or HDD 104 is shown in simplified form sufficient for understanding the present invention. The illustrated host computer 102 together with the storage device or HDD 104 is not intended to imply architectural or functional limitations. The present invention can be used with various hardware implementations and systems and various other internal hardware devices.

Figure 2:
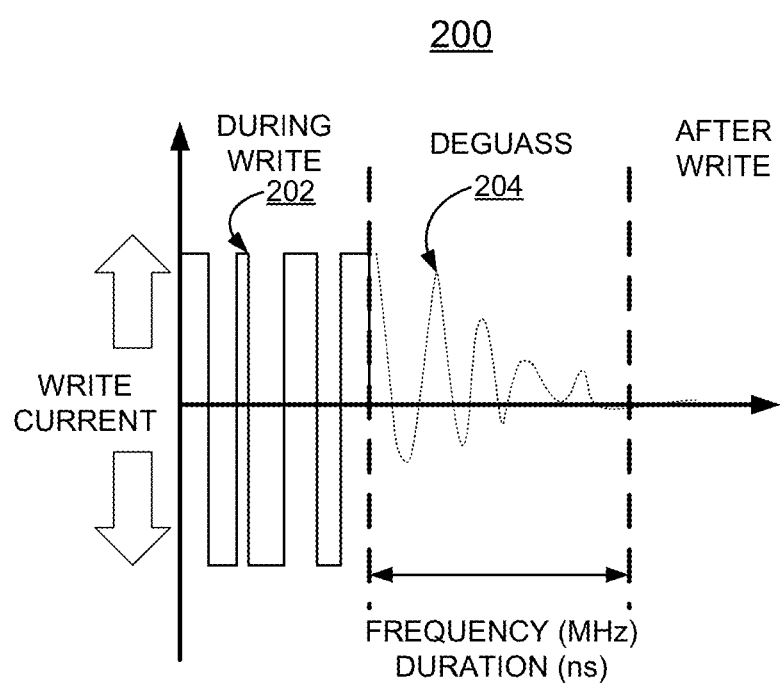
FIGS. 2 and 3 are diagrams illustrating a respective example asymmetric degauss waveform for disk drives (HDDs) in accordance with preferred embodiments.
Figure 3:
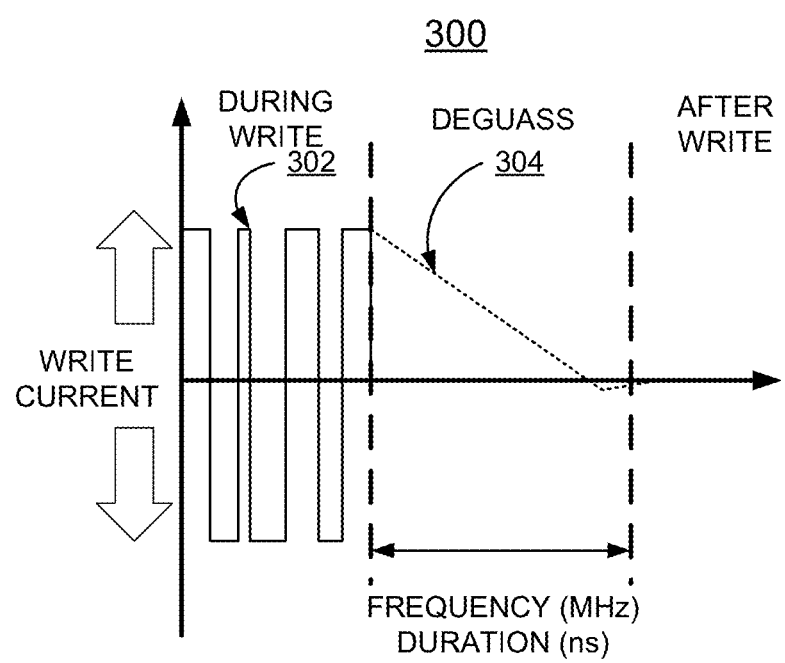

Referring also to FIGS. 2 and 3, there are shown respective diagrams illustrating a respective example asymmetric degauss waveform for disk drives (HDDs) in accordance with preferred embodiments.

In FIG. 2, there is shown write current waveforms generally designated by the reference character 200 including an example write current waveform 202 during a write followed by a write current degauss waveform 204 during a degauss interval. Note that in accordance with preferred embodiments the write current degauss waveform 204 during the degauss interval is an asymmetric waveform so that write head is driven asymmetrically with respect to the positive and negative driving currents during the degauss period. The average value of the write current degauss waveform 204 during the degauss period is non-zero.

In FIG. 3, there is shown write current waveforms generally designated by the reference character 300 including an example write current waveform 302 during a write followed by a write current degauss waveform 304 during a degauss interval. Note that in accordance with preferred embodiments the write current degauss waveform 304 during the degauss interval is a single polarity current waveform so that write head is driven asymmetrically with the write current degauss waveform 304 decaying linearly during the degauss period, as shown. The write current degauss waveform 304 could decay exponentially during the degauss period. Also the average value of the write current degauss waveform 304 during the degauss period is non-zero.

Figure 4:
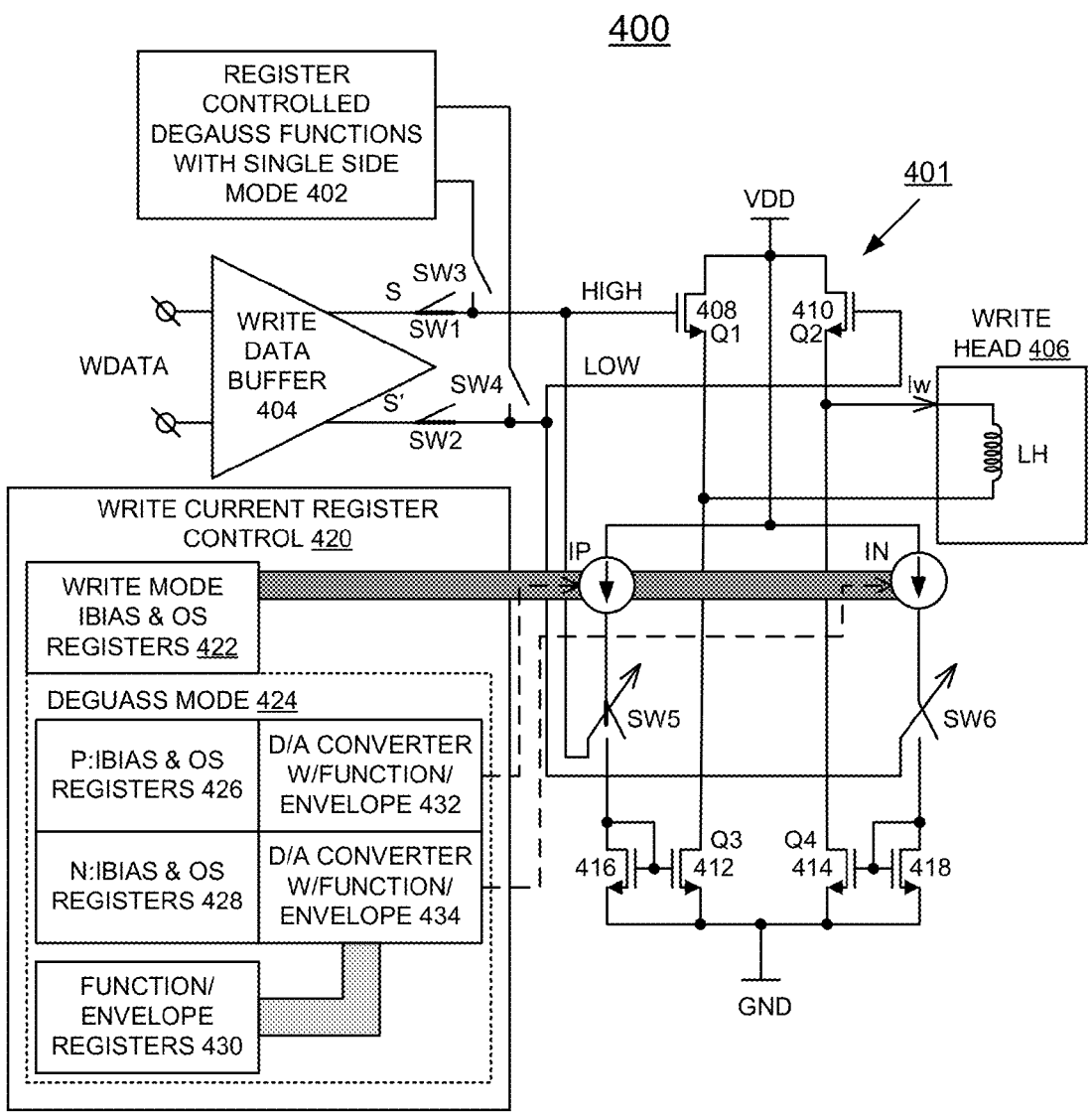
FIG. 4 schematically illustrates not to scale an example circuit implementing asymmetric degauss control for hard disk drives (HDDs) in accordance with preferred embodiments.

Referring also to FIG. 4, there is shown an example circuit architecture generally designated by the reference character 400 for implementing asymmetric degauss control in accordance with preferred embodiments. Asymmetric degauss circuit 400 implements the asymmetric degauss function in accordance with preferred embodiments and is located, for example, in the Read/Write (R/W) integrated circuit (IC) 117 or preamplifier 117. Asymmetric degauss circuit 400 includes write driver base circuitry generally designated by the reference character 401 that is coupled to a register controlled degauss function 402 with a single side mode and coupled to a write data buffer 404 via respective circuit switches Sw1, Sw2, and circuit switches Sw3, and Sw4. The write driver base circuitry 401 is connected to write head 406 with components and connections of the write driver base circuitry 401 shown in bold.

As shown, the write driver base circuitry 401 is a H-bridge circuit including a plurality of N-channel field effect transistors (NFETs) Q1, 408, Q2, 410, Q3, 412, 2Q4, 414, a pair of diode connected NFETs 416, 418, a pair of current sources IP, IN, and a pair of circuit switches, Sw5, Sw6. Respective series connected NFETs 108, 412 and NFETs 410, 414 are connected between a positive supply rail VDD and a ground rail GND. A respective common connection of NFETs 108, 412 and NFETs 410, 414 is connected to opposite ends of the write head 406. The respective current sources IP, IN are connected in series with respective circuit switches, Sw5, Sw6 between the positive supply rail VDD and the respective diode connected NFETs 416, 418.

Asymmetric degauss circuit 400 includes a write current register control 420 including Write Mode IBIAS and OS registers 422 and Degauss Mode: P:IBIAS and OS registers 426, N:IBIAS and OS registers 428, Function/Envelope registers 430, a pair of digital-to-analog (D/A) converters with Function/Envelope 432, 434.

The circuit switches, Sw1, Sw2, Sw3, and Sw4 are shown in write mode position, with High and Low logic outputs of write data buffer 404 and circuit switches Sw5 and Sw6 settings that drives the write current, Iw, through the write head 406 in the direction shown. The bias, Iw, and overshoot, OSA, is register controlled and is shown by the thick arrows to each current source, IP and IN. In Degauss mode, switches, Sw 1-4, are switched opposite of what is shown, such that the write signal is now driven by the register controlled Degauss function 402. The Degauss write current has the independent register control 426, 428 for the positive and negative polarity. These independent register values of respective registers 426, 428 are then processed through the respective digital-to-analog (D/A) converters with Function/Envelope 432, 434. In addition, ramp-down control is also processed through the D/A Function/Envelope 432, 434. The Function/Envelope 432, 434 is controlled by the Function/Envelope registers 430 including function ramp, function exponential, and rate control.

Figure 5:
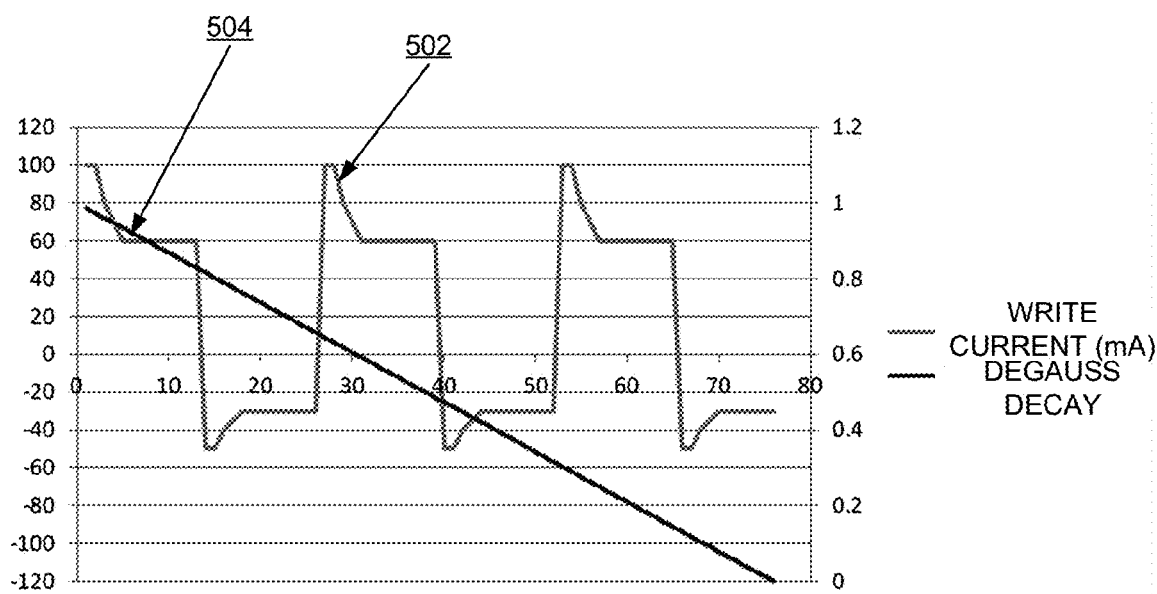
FIG. 5 is a diagram illustrating an example asymmetric degauss waveform for disk drives (HDDs) in accordance with preferred embodiments.

Referring also to FIG. 5, there is shown an example asymmetric degauss waveform generally designated by the reference character 500 for disk drives (HDDs) in accordance with preferred embodiments. The asymmetric degauss waveform 500 includes a convolution of a highly asymmetric ringing, single tone current degauss waveform 502 and a decay modulation degauss waveform 504. As a result, there is a high asymmetry between the adjacent pulses and it is independent of the starting polarity of the degauss waveform.

Figure 6A:
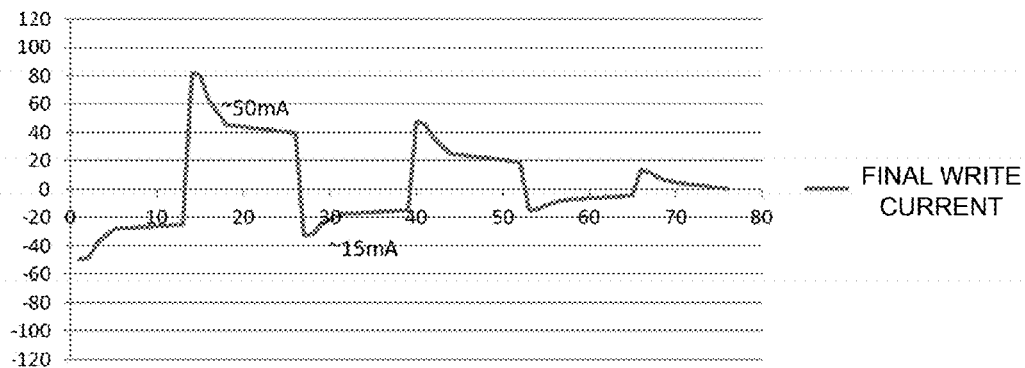
FIGS. 6A, and 6B are respective diagrams illustrating a respective example final write current waveform starting with negative pulse and starting with a positive pulse for disk drives (HDDs) in accordance with preferred embodiments.
Figure 6B:
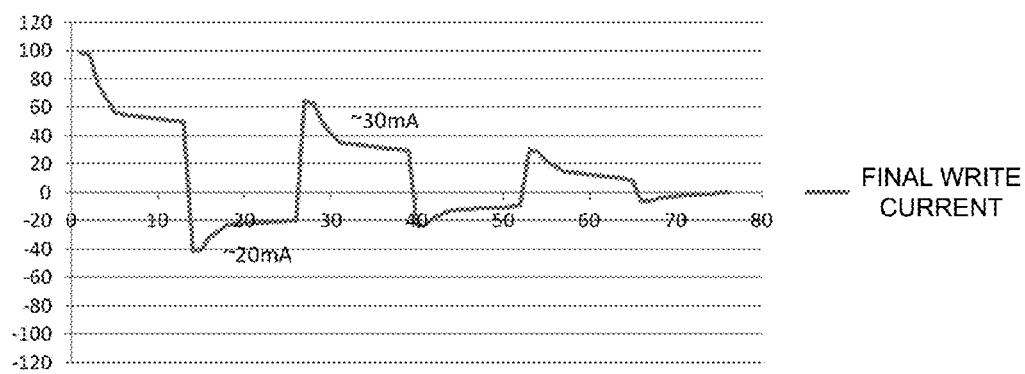

FIGS. 6A, and 6B there are shown a respective example final write current waveform starting with negative pulse and starting with a positive pulse for disk drives (HDDs) in accordance with preferred embodiments.

In FIG. 6A, the final write current waveform generally designated by the reference character 600 starts with the negative pulse and there is a highly asymmetry between adjacent pulses.

In FIG. 6B, the final write current waveform generally designated by the reference character 610 starts with the positive pulse and there is a highly asymmetry between adjacent pulses.

Referring now to FIG. 7, an article of manufacture or a computer program product 700 of the preferred embodiments is illustrated. The computer program product 700 includes a computer readable recording medium 702, such as, a floppy disk, a high capacity read only memory in the form of an optically read compact disk or CD-ROM, a tape, or another similar computer program product. Computer readable recording medium 702 stores program means or control code 704, 706, 708, 710 on the medium 702 for carrying out the methods for implementing enhanced asymmetric degauss control in accordance with preferred embodiments in the system 100 of FIG. 1.

A sequence of program instructions or a logical assembly of one or more interrelated modules defined by the recorded program means or control code 704, 706, 708, 710, direct SSD controller 114 using asymmetric degauss circuit 400 of the system 100 for implementing enhanced asymmetric degauss control of preferred embodiments.

While the present invention has been described with reference to the details of the embodiments of the invention shown in the drawing, these details are not intended to limit the scope of the invention as claimed in the appended claims.

What is claimed is:

1. A method for implementing degauss control for hard disk drives comprising:
   providing at least one disk; said disk including a disk media for storing data;
   providing a slider including a write head;
   providing degauss control circuitry coupled to said write head; providing said degauss control circuitry with a pair of digital-to-analog (D/A) converters, each D/A converter provided with a respective function envelope to control positive and negative degauss write current including positive and negative degauss write current function ramp, function exponential, and rate control; and
   applying asymmetric degauss write current to said write head using said degauss control circuitry during a degauss period; said applied asymmetric degauss write current decreasing from a maximum value to a zero value during the degauss period and having a greater positive portion than negative portion with an average value of the applied asymmetric degauss write current during the degauss period being greater than zero; and providing a degauss waveform including a convolution of a highly asymmetric ringing, single tone current degauss waveform and a decay modulation degauss waveform providing asymmetry between adjacent pulses independent of a starting polarity of the degauss waveform during the degauss period.

2. The method as recited in claim 1 wherein providing degauss control circuitry includes providing said degauss control circuitry coupled to write driver base circuitry, applying symmetric write current using said write driver base circuitry.

3. The method as recited in claim 1 wherein providing degauss control circuitry includes providing an independent register control for controlling positive and negative polarity write drive current.

4. The method as recited in claim 3 includes coupling each independent register control for positive and negative polarity drive current to a respective current source, said respective current source respectively controlling positive and negative polarity drive current.

5. The method as recited in claim 3 includes coupling each independent register control for positive and negative polarity drive current to a said respective digital-to-analog (D/A) converter with said respective function envelope.

6. The method as recited in claim 5 includes providing ramp-down control using each said respective D/A converter with said respective function envelope.

7. The method as recited in claim 5 includes providing function envelope registers for controlling said function envelope, said function envelope registers for controlling said ramp, function exponential, and rate control for said function respective envelope.

8. The method as recited in claim 1 wherein providing degauss control circuitry includes implementing said degauss control circuitry in a Read/Write integrated circuit (IC).

9. The method as recited in claim 1 wherein applying asymmetric degauss write current to said write head using said degauss control circuitry during a degauss period includes providing said ramp, function exponential, and rate control for positive and negative polarity drive current of said applied asymmetric degauss write current.

10. An apparatus for implementing degauss control for hard disk drives comprising:
    a controller;
    at least one disk; said disk including a disk media for storing data;
    a slider including a write head; said write head including a write pole and a write return pole;
    degauss control circuitry coupled to said write head, said degauss control circuitry including a pair of digital-to-analog (D/A) converters, each D/A converter provided with a respective function envelope to control positive and negative degauss write current including positive and negative degauss write current function ramp, function exponential, and rate control;
    said controller coupled to said degauss control circuitry for applying asymmetric degauss write current to said write head during a degauss period; said applied asymmetric degauss write current decreasing from a maximum value to a zero value during the degauss period and having a greater positive portion than negative portion with an average value of the applied asymmetric degauss write current during the degauss period being greater than zero; and providing a degauss waveform including a convolution of a highly asymmetric ringing, single tone current degauss waveform and a decay modulation degauss waveform providing asymmetry between adjacent pulses independent of a starting polarity of the degauss waveform during the degauss period.

11. The apparatus as recited in claim 10 wherein said degauss control circuitry is coupled to write driver base circuitry for applying asymmetric degauss write current to said write head during the degauss period, said write driver base circuitry applying symmetric write current for writing data.

12. The apparatus as recited in claim 10 includes control code stored on a non-transitory computer readable medium, and wherein said controller uses said control code for implementing asymmetric degauss control.

13. The apparatus as recited in claim 10 wherein said degauss control circuitry includes an independent register control for controlling positive and negative polarity write drive current.

14. The apparatus as recited in claim 13 wherein said degauss control circuitry includes respective current sources coupled to each independent register control for controlling positive and negative polarity drive current, said respective current sources respectively controlling positive and negative polarity drive current.

15. The apparatus as recited in claim 13 includes said respective digital-to-analog (D/A) converter with said respective function envelope coupled to each independent register control for controlling positive and negative polarity drive current.

16. The apparatus as recited in claim 15 wherein said respective D/A converter with said respective function envelope provides ramp-down control for controlling positive and negative polarity drive current.

17. The apparatus as recited in claim 15 includes function envelope registers for controlling said respective function envelope, said function envelope registers for controlling said ramp, function exponential, and rate control for said respective function envelope.

18. The apparatus as recited in claim 10 wherein said degauss control circuitry is implemented in a Read/Write integrated circuit (IC).

19. A system for implementing degauss control for hard disk drives comprising:
- at least one disk; said disk including a disk media for storing data;
- a slider including a write head; said write head including a write pole and a write return pole;
- degauss control circuitry coupled to said write head, said degauss control circuitry including a pair of digital-to-analog (D/A) converters, each D/A converter provided with a respective function envelope to control positive and negative degauss write current including positive and negative degauss write current function ramp, function exponential, and rate control; and
- said degauss control circuitry coupled to said write head for applying asymmetric degauss write current to said write head during a degauss period; said applied asymmetric degauss write current decreasing from a maximum value to a zero value during the degauss period and having a greater positive portion than negative portion with an average value of the applied asymmetric degauss write current during the degauss period being greater than zero; and providing a degauss waveform including a convolution of a highly asymmetric ringing, single tone current degauss waveform and a decay modulation degauss waveform providing asymmetry between adjacent pulses independent of a starting polarity of the degauss waveform during the degauss period.

20. The system as recited in claim 19 includes a controller coupled to said degauss control circuitry, and control code stored on a non-transitory computer readable medium, and wherein said controller uses said control code for implementing asymmetric degauss control for applying asymmetric degauss write current to said write head during the degauss period.

* * * * *